United States Patent [19]

Fuchs

[11] Patent Number: 5,216,322
[45] Date of Patent: Jun. 1, 1993

[54] METHOD OF PRODUCING A GAS DISCHARGE LIGHT SOURCE

[75] Inventor: Herbert K. Fuchs, Mahone Bay, Canada

[73] Assignee: Vector Related Physics (Consultants) Ltd., St. Helier, United Kingdom

[21] Appl. No.: 845,977

[22] Filed: Mar. 4, 1992

Related U.S. Application Data

[62] Division of Ser. No. 714,390, Jun. 12, 1991, Pat. No. 5,114,372.

[30] Foreign Application Priority Data

Jun. 12, 1990 [DE] Fed. Rep. of Germany ....... 4018792

[51] Int. Cl.$^5$ ...................... H01J 17/26; H01J 61/28
[52] U.S. Cl. ...................... 313/484; 313/490
[58] Field of Search .................. 313/484, 485, 490

[56] References Cited

U.S. PATENT DOCUMENTS

| | | |
|---|---|---|
| 2,755,159 | 7/1956 | Bernier et al. . |
| 2,892,665 | 6/1959 | Fraser . |
| 3,005,674 | 10/1961 | Fraser . |
| 3,263,111 | 7/1966 | Doering .................. 313/490 |
| 3,309,565 | 3/1967 | Clark et al. . |
| 3,351,797 | 11/1967 | Eckhardt et al. ............... 313/490 X |
| 3,957,328 | 5/1976 | van der Wolf et al. . |
| 4,005,332 | 1/1977 | Gallo et al. . |
| 4,431,947 | 2/1984 | Ferriss et al. . |
| 4,849,903 | 8/1989 | Minematu et al. . |

FOREIGN PATENT DOCUMENTS

| | | |
|---|---|---|
| 1240990 | 5/1967 | Fed. Rep. of Germany . |
| 2212536 | 3/1972 | Fed. Rep. of Germany . |
| 3036088 | 9/1980 | Fed. Rep. of Germany . |
| 113983 | 9/1979 | Japan .................. 313/490 |

Primary Examiner—Sandra L. O'Shea
Attorney, Agent, or Firm—Nikaido, Marmelstein, Murray & Oram

[57] ABSTRACT

A method for producing a gas discharge light source for emitting an electromagnetic radiation includes a gas discharge tube filled with at least one discharge gas material and having a device for generating a gas discharge includes the following method steps: igniting the gas discharge tube filled with the discharge gas material, performing a forming operation in which the electrical operating power of the gas discharge light source is at least as high as the desired continuous operation power, the gas discharge tube is held at a temperature which is at least as high as the subsequent operating temperature, the intensity of the emitted electromagnetic radiation in the region of the desired wavelengths is monitored and the partial pressure of the vaporized discharge gas material is varied until the intensity of the selected electromagnetic radiation has reached a maximum value, whereupon a reservoir with excess discharge gas material is separated from the gas discharge tube in such a manner that the gas discharge tube under operating conditions does not contain any condensed discharge gas material. A gas discharge tube having a discharge material forming a discharge gas under operating conditions is distinguished in that the discharge gas material is incorporated in the inner wall of the gas discharge tube and there is no longer any condensed discharge gas material in the gas discharge tube.

4 Claims, 2 Drawing Sheets

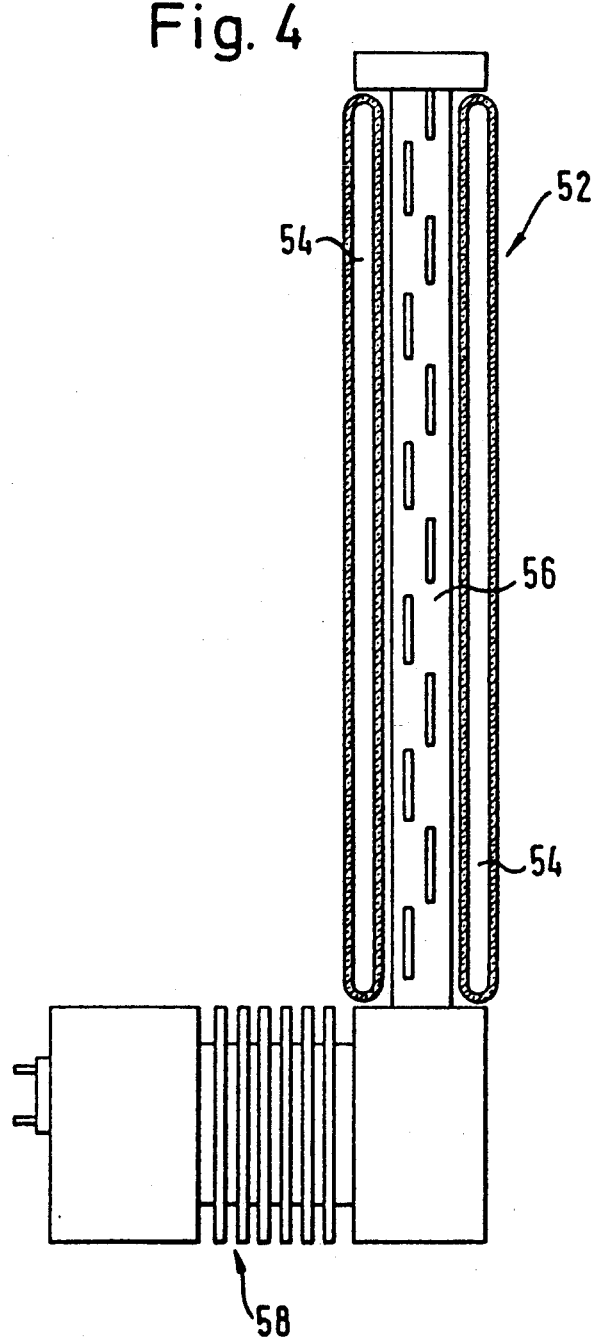

METHOD OF PRODUCING A GAS DISCHARGE LIGHT SOURCE

This is a division of application Ser. No. 714,390 filed Jun. 12, 1991 now U.S. Pat. No. 5,114,372.

BACKGROUND OF THE INVENTION

1. Field of the Invention

The invention relates to a method of producing a gas discharge light source for emitting an electromagnetic radiation comprising a gas discharge tube which is filled with at least one discharge gas material, and a means for generating a gas discharge.

2. Description of the Prior Art

Such a method is known for example from U.S. Pat. No. 2,755,159. To ensure the suitable operating voltage of the gas discharge light source irrespective of the amount of discharge gas material (mercury) introduced and of variations of the dimensions, which both considerably influence the operating voltage, an excess of mercury is introduced and the excess then expelled again. A voltage source is connected to the gas discharge light source and the filled gas discharge tube ignited. The voltage present at the electrodes of the gas discharge tube is monitored, the voltage rising gradually until the entire mercury has evaporated and then starting to drop again when vapour from the overheated main section of the gas discharge tube reaches a colder side arm and condenses there. As soon as the voltage has dropped to a desired value the voltage source is switched off and the side arm serving as reservoir for excess discharge material is melted off. The steps described are intended to achieve that independently of the variations the operating voltage is fixed to 1 to 2 volts.

In U.S. Pat. No. 3,309,565 a fluorescence lamp is proposed in which in operation a temperature stabilization of a supply of condensed mercury takes place (a so called "cold spot"). For this purpose, with the aid of a Peltier element the cold spot is cooled and the vapour pressure of the discharge material (mercury) held at a value which permits an optimum light emission of the gas discharge light source in operation.

In U.S. Pat. No. 4,431,947 a regulated light source is described which in operation makes available a light flux of constant intensity at a desired wavelength by employing a closed-loop control system which holds the intensity of a lamp generating light at a predetermined value. Such a light source of constant intensity is used for special purposes, for example in instruments operating with nuclear magnetic resonance, such as a magnetic resonance gyroscope. To achieve the desired constancy of the light at the desired wavelength, another wavelength is monitored and a control signal is derived therefrom which finally controls the temperature of a "cold end" of the light source.

In DE-PS 2,212,536 a method is proposed for producing a fluorescent lamp with which the aim is to ensure that the lamp bulb remains uninfluenced from impurities liberated on activation of the lamp cathodes. For this purpose the cathodes are activated outside the chamber in which the lamp bulb is filled, the impurities are removed and end caps with the cathodes are then sealed into the ends of the lamp bulb.

DE-OS 336,088 describes a production method for gas discharge lamps in which for removing impurities from the bulb interior the lamp is ignited and/or heated, a continuous stream of an inert ignitable gas being conducted through the bulb during the discharge and/or the heating.

As flushing gas for example argon or another noble gas may be used.

In the prior art there has been no lack of further attempts to improve substantial parameters of such gas discharge light sources, for example the intensity of the emitted electromagnetic radiation, the stability and the like.

Thus, U.S. Pat. No. 4,157,485 has already proposed a low-pressure mercury vapour lamp in which the aim is to operate the mercury vapour lamp with maximum efficiency. For this purpose, it is considered necessary to keep the optimum mercury partial pressure of $6 \times 10^{-3}$ Torr, corresponding to a temperature of the mercury of about 40° C., as constant as possible. For if the lamp temperature rises above the ambient temperature at which the mercury in the discharge would have a temperature of about 40° C. the efficiency drops and consequently the lamp power fluctuates with fluctuating ambient temperature. If the electrical power supplied to the lamp is increased the temperature rises and this in turn leads to a reduction of the conversion efficiency. i.e. the conversion of the electrical power supplied into electromagnetic radiation power. To ensure that the mercury partial pressure is stable over a wide temperature range at about the value $6 \times 10^{-3}$, the use of an amalgam of bismuth, indium and mercury having a predetermined composition is proposed. This is said to be advantageous compared with already known amalgam compositions because in the known amalgam compositions the mercury proportion in the amalgam drops in operation because part of the mercury is bonded, in particular by absorption in a fluorescence layer.

A further improvement of the deposition mercury vapour lamp described in U.S. Pat. No. 4,157,485 has been proposed in EP-A1-0 157 440. In particular, with a higher discharge current and with a lamp tube of small diameter the stabilization value of the mercury vapour pressure with the amalgam proposed in the American patent specification is too low to obtain an optimum efficiency and maximum light output power. For at temperatures in the range of 100°-120° C. in the region of the amalgam the mercury pressure drops beneath $6 \times 10^{-3}$ Torr. For this reason, EP-A1-0 157 440 proposes an alloy which forms an amalgam and consists of bismuth, lead and silver. This is intended to give an optimum light output power at a temperature of 70°-150° C. in the region of the amalgam. The alloy of bismuth, lead and silver is provided for this purpose at a so called "cold spot" of the mercury vapour lamp at which a condensation takes place.

In U.S. Pat. No. 3,878,421 a high-power lamp for ultraviolet radiation is proposed which has a special electrode arrangement. The lamp tube here has a relatively large diameter and is provided with constricted end portions. Cold points, that is cold spots, form there in order to achieve partial condensation of the mercury vapour and thus prevent an excess vapour pressure of the mercury occurring which would reduce the lamp efficiency. The length of the end portions is greater or equal to twice the diameter of the end portions.

U.S. Pat. No. 4,005,332 describes a mercury fluorescence lamp which is operated with direct current. Whereas with alternating current operation an optimum efficiency is obtained at a mercury partial pressure of $7 \times 10^{-3}$ Torr corresponding to a temperature of 40° C.

at the "cold spot" of the mercury, the exact values depending among other things on the lamp tube radius, the optimum temperature is obviously different in direct current operation. This optimum temperature depends on the poling in direct current operation and for a cold spot at the anode end of the gas discharge tube lies beneath 40° C., the optimum temperature decreasing with increasing lamp current, whereas with an arrangement of the cold spot at the cathode end the optimum temperature is greater than 40° C. and rises with increasing temperature. For this reason it is proposed in U.S. Pat. No. 4,005,332 to arrange the cold spot in a water bath, the temperature of which can be varied. In operation in this case enough mercury to ensure that a certain proportion thereof is always liquid is always present in the fluorescent lamp.

In U.S. Pat. No. 4,349,765 a mercury vapour lamp is proposed for ultraviolet radiation of high intensity in which mercury and inert gas are provided and the discharge takes place at a pressure of $5 \times 10^{-3}$ to $5 \times 10^{-1}$ Torr mercury and $5 \times 10^{-2}$ to 10 Torr inert gas. The gas discharge tube consists of a quartz glass which is so doped that the lines of 185 nm and 194 nm of the emitted radiation are absorbed whereas the line of 254 nm passes through practically unattenuated. To set the optimum vapour pressure of the mercury a cold spot is again provided, i.e. a point at which the mercury is present in condensed, i.e. liquid form, and the temperature of the cold spot can be adjusted between 48° and 65° C. With this vapour pressure adjustment an intensity adjustment can be achieved.

An improvement of this ultraviolet gas discharge lamp is proposed in U.S. Pat. No. 4,835,442. To avoid fluctuations of the essential parameters of the gas discharge lamp a reservoir is proposed which serves as cold spot and the temperature of which can be adjusted. The reservoir is temperature-isolated with respect to the surroundings to eliminate said fluctuations.

An ultraviolet gas discharge lamp similar to that described in U.S. Pat. No. 4,349,765 is also disclosed in GB-PS 2,009,493.

In CH-PS 570,040 a mercury vapour lamp is described as ultraviolet radiation source in which the gas discharge tube comprises a pressure equalizing space which connects the cathode space to the anode space. The sum of the volumes of the cathode space, the anode space and the pressure equalizing space is to be greater here than the volume of the discharge space. By a control member the mercury partial pressure is regulated so that the radiation yield in the region of 254 nm is at least 80% of the, yield maximum. In this mercury vapour lamp as well a so called cold spot is provided at which a drop of condensed, i.e. liquid, mercury is disposed.

Thus, in accordance with the prior art described above the desired improvement of the properties of gas discharge light sources is achieved by specific steps which fix the operation of the gas discharge light sources, i.e. the actual operating conditions.

SUMMARY OF THE INVENTION

The present invention therefore has as its object to increase still further the power of gas discharge light sources that is to increase the light intensity output thereof.

The knowledge on which the invention is based resides in not changing the actual operating conditions but optimizing the operating conditions then subsequently occurring in operation by certain method steps in the production of a gas discharge light source, i.e. before the actual operation.

The present invention therefore proposes in a method for producing a gas discharge light source for emitting an electromagnetic radiation comprising a gas discharge tube which is filled with at least one discharge gas material, and a means for generating a gas discharge, the improvement comprising the method steps of a) igniting the gas discharge tube filled with the discharge gas material, b) performing a forming operation in which b.1) the electrical operating power of the gas discharge light source is at least as high as the desired continuous operation power, b.2) the gas discharge tube is held at a temperature which is at least as high as the subsequent operating temperature, b.3) the intensity of the emitted electromagnetic radiation in the region of the desired wavelengths is monitored and b.4) the partial pressure of the vaporized discharge gas material is varied until the intensity of the selected electromagnetic radiation has reached a maximum value, c) whereupon a reservoir with excess discharge gas material is separated from the gas discharge tube in such a manner that the gas discharge tube under operating conditions does not contain any condensed discharge gas material.

A further solution according to the invention is achieved by a gas discharge tube comprising a discharge gas material which under operating conditions forms a discharge gas, the discharge gas material being incorporated in the inner wall of the gas discharge tube and no condensed discharge gas material then being present in the gas discharge tube.

Thus, in a surprising departure from the prior art a gas discharge tube is produced which does not have a cold spot.

Due to the complicated conditions obtaining in a gas discharge light source in operation and depending on the temperature of the discharge tube, the conditions in the ignited discharge gas plasma, but also on the gas flow processes in the gas discharge tube, the effective mechanism which results in the advantageous properties of a gas discharge light source made according to the method of the invention has still not been fully explained. It would however appear that the ratio of electron energy and electron density in the plasma to the partial pressure of the discharge gas always preferably represents certain ranges of the spectrum of the discharge gas.

It is assumed that by the method according to the invention some of the discharge gas is deposited in the walls of the gas discharge tube in such a manner that later under operating conditions an optimum discharge gas concentration arises. The electromagnetic radiation power in desired spectral ranges of gas discharge light sources produced by the method according to the invention is several times greater than the power which can be achieved with the prior art, typically at least 300%.

Advantageous further developments of the invention are set forth in the subsidiary claims.

Advantageously, as discharge gas mercury is used and may be present as pure mercury or amalgam. In addition, the gas discharge tube may be filled with an inert gas or a mixture of inert gases, in particular to achieve easier igniting and a more stable plasma.

In an advantageous further development of the method according to the invention prior to the firing of the gas discharge tube filled with the discharge gas a heating of the gas discharge tube is effected. The period for the heating is advantageously about 2 hours, and at a temperature of about 250° C.

To avoid discharge gas depositing in the forming operation at a point which in subsequent operation of the gas discharge tube is in connection with the latter, during the forming operation the portion of the reservoir leading to the gas discharge tube is advantageously held at a temperature which is equal to or greater than the wall temperature of the gas discharge tube.

To set the optimum partial pressure of the discharge gas in the forming operation the temperature of the reservoir is preferably varied.

The temperature of the reservoir here is preferably reduced so that the partial pressure of the discharge gas diminishes.

In a particularly advantageous further development of the method according to the invention in the forming operation the electrical operating power of the gas discharge tube is about 25% to about 50% higher than the desired continuous operation power.

BRIEF DESCRIPTION OF THE DRAWINGS

The invention will be explained in detail with the aid of examples of embodiment which are illustrated in the drawings, wherein:

FIG. 4 a further gas discharge tube which is however electrodeless and in which the discharge is maintained with microwave radiation.

DESCRIPTION OF THE PREFERRED EMBODIMENTS

Figure 1:
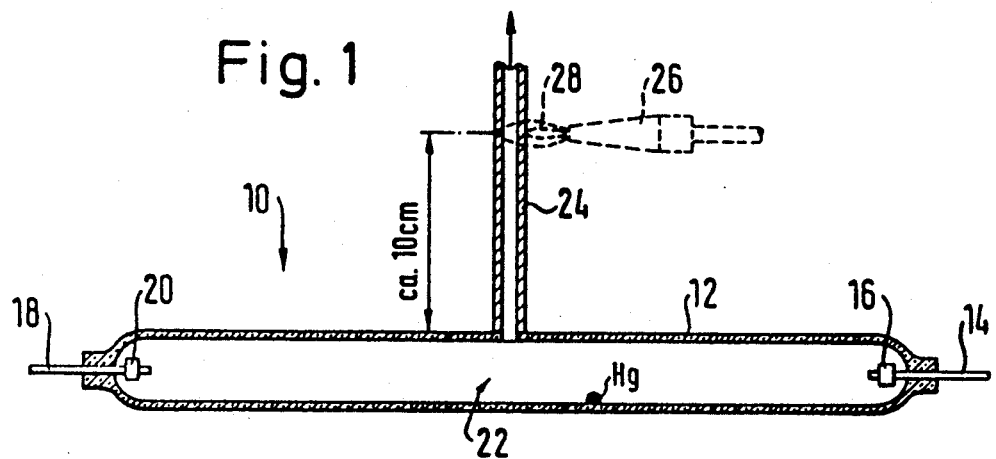
FIG. 1 is a mercury vapour lamp with attached pump tube.

The gas discharge tube 10 illustrated in FIG. 1 is known per se from the prior art. A tubular quartz tube 12 is fused gas-tight at its ends, current leads 14 and 18 for thermoemissive electrodes 16 and 20 respectively being fused in. A pump tube 24 is in communication with the discharge space 22 of the quartz tube 12. The pump tube can be specifically heated, this being done via the flame 28 of a burner 26.

Figure 2:
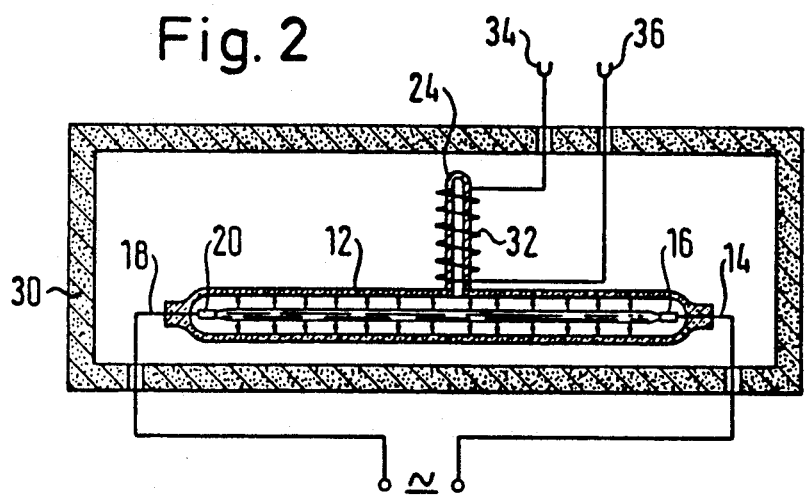
FIG. 2 shows the mercury vapour lamp according to FIG. 1 introduced into a heatable container.

In FIG. 2 the quartz tube 12 is introduced into a heatable container 30. The pump tube 24 is surrounded by a heating winding 32 which is supplied with current via connection leads 34, 36. Furthermore, in FIG. 2 the leads for the current supplies 14, 18 are shown for the application of an alternating current voltage thereto.

Figure 3:
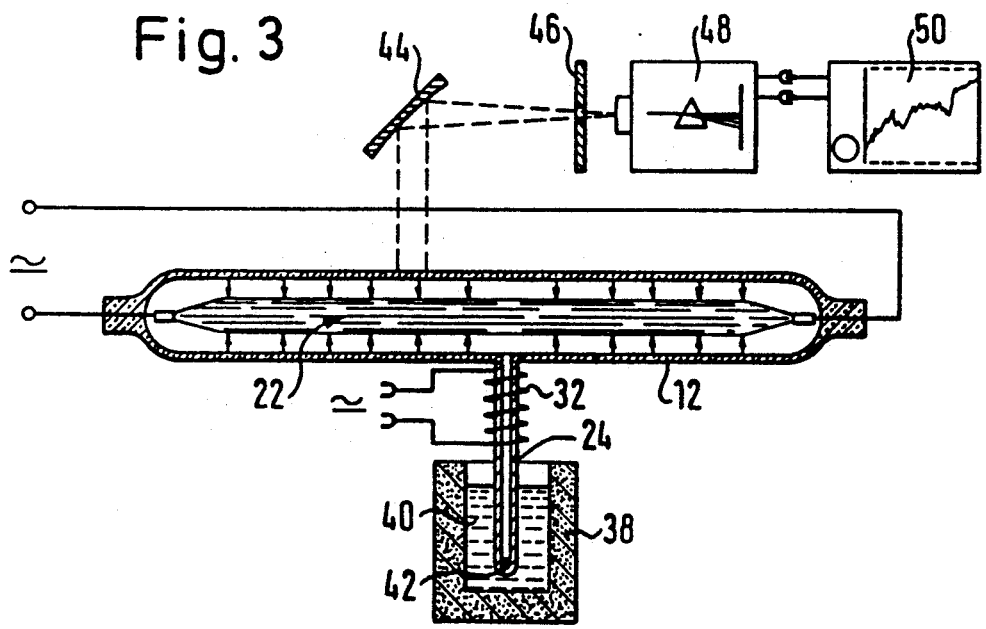
FIG. 3 shows the mercury vapour lamp according to FIG. 1, the molten (sealed) pump tube of which is immersed into a container of which the temperature can be varied, and a measuring means for determining the intensity of the electromagnetic radiation emitted by the mercury vapour lamp.

FIG. 3 shows the gas discharge light source with the quartz tube 12 and a means for temperature adjustment of the pump tube 24 as well as a measuring means for determining and monitoring the electromagnetic radiation emitted by the gas discharge light source in the particular spectral range of interest.

The electromagnetic radiation emerging from a certain region of the discharge space 22 passes via a mirror 44 and a diaphragm 46 to a schematically illustrated spectral photometer 48, the output signal of which, i.e. the electromagnetic intensity in the particular spectral range set, is passed to a recorder 50 which records the intensity as a function of time.

The pump tube 24 provided with the heating means 32 already described is melted off, i.e. sealed, and at the lower end of the fused pump tube 24 there is a drop 42 of condensed mercury. This is however dependent on the temperature of this portion of the pump tube 24, and for adjusting the temperature the pump tube 24 is immersed into a liquid 40 with which a temperature-adjustable container 38 is filled.

FIG. 4 shows a further embodiment of a gas discharge light source in which, in contrast to the embodiment described in FIGS. 1 to 3, the electrical power is introduced into a gas discharge tube 52 not by means of electrodes but (electrodeless) via microwave radiation.

For this purpose the gas discharge tube 52 according to FIG. 4 is constructed as double-wall hollow quartz tube having concentric walls. The discharge space 54 is formed by the annular space between the outer and the inner tubes. The concentric tubes are fused together in gas-tight manner at their ends.

The supply of electrical energy is by the microwave radiation which is generated by a magnetron tube 58 and is emitted by a radially irradiating waveguide slot antenna 56.

The method according to the invention can be used in gas discharge tubes provided with electrodes and in electrodeless gas discharge tubes.

After the usual steps, such as cleaning pumping, evacuation, possibly activation of the electrodes 16, 20, the gas discharge tube 12 illustrated in FIGS. 1 to 3 is filled in known manner with an inert ignition gas, for example argon, krypton, xenon, neon or a mixture of such gases, at a pressure of 50-500 Pascal, preferably 150 Pascal. A small amount of about 15-20 mg pure elementary mercury is then introduced. The pump tube 24 is then melted off and sealed so that the remaining length is about 10 cm.

The already functionable gas discharge light source, which has however not yet been optimized, is then introduced into the container 30 constructed as a heat cabinet and preferably preheated there for about 2 hours at a temperature of 250° C.

The gas discharge in the gas discharge tube 12 is then ignited and operated with an electrical power about 25% to about 50% higher than the subsequent desired operating power. The sealed pump tube 24 is brought here by the separate heating means 32 to at least the wall temperature of the gas discharge tube 12.

Apparently, due to the comparatively high mercury vapour pressure in the system, mercury atoms and molecules diffuse into the upper molecule layers of the inner wall of the hot gas discharge tube 12. After completion of this burning-in diffusion operation, which under the conditions given above about 30 minutes, the ignition voltage is switched off and the tube cools slowly in the heat container 30. A further diffusion of mercury into the inner wall of the gas discharge tube 12 apparently takes place when this is done.

As illustrated in FIG. 3, the measuring means 44-50 is then attached to record the desired electromagnetic radiation emitted in operation of the gas discharge tube 12, i.e. in the present case the 254 nm line of mercury.

It must be ensured that the gas discharge tube 12 is disposed in surroundings having a temperature corresponding approximately to the ambient temperature of the later intended use. The expediently downwardly directed pump tube 24 is heated with the heating means 32 over a distance of about 30-40 mm adjoining the gas discharge tube 12. It has been found that it must be avoided at all costs that in this region, that is the subsequent melting-off and fusing point, condensed mercury is able to form, since it could later evaporate back again into the gas discharge tube 12. For this purpose, this portion of the pump tube 24 is heated to a temperature which is higher than the temperature of the wall of the gas discharge tube 12 under operating conditions.

The gas discharge is now ignited and maintained with the desired operating power. After some time, temperature equalization with the surroundings establishes itself.

The lower portion of the pump tube 24 is now dipped into the vessel 38 with the liquid 40. In the present case the liquid is cooling liquid, that is a salt solution at about $-3°$ C. Thereupon, in the cooled portion of the pump tube 24 a condensate 42 forms, that is a mercury droplet, and the mercury content in the plasma in the gas discharge space 22 is depleted.

Now, if the mercury partial pressure in the plasma becomes smaller than the diffusion pressure of the mercury incorporated in the inner wall of the gas discharge tube 12, the diffusion of the mercury back into the discharged space 22 begins. In this connection, in particular the wall temperature of the gas discharge tube 12 and the amount of diffused-in mercury are of significance. Due to further depletion of the plasma mercury content by continuous condensation of the mercury in the cooled part of the pump tube 24 and the likewise progressive depletion of the diffused-in content of mercury in the walls of the gas discharge tube 12 and the resulting fusion back, an equilibrium state of the mercury partial pressure in the plasma and the diffusion pressure from the inner wall of the gas discharge tube at continuously decreasing values occurs.

The intensity of the 254 nm line of mercury recorded by the recorder 50 is very low in the initial phase and in spite of the comparatively high operating power of the tube reaches only a fraction of the values which would be reached with a standard low-pressure lamp of the same dimensions. With progressive reduction of the mercury concentration in the plasma the electromagnetic radiation intensity rises and finally reaches a peak value which in comparison with a standard low-pressure lamp is approximately proportional to the increase of the electrical operating power in the present case.

As soon as the resulting intensity maximum value is reached, which is recorded by the photometer 48 and the recorder 50 connected thereto, the pump tube 24 with the condensed mercury contained therein is melted as quickly as possible off the gas discharge tube to fix the optimum state reached. The melting takes place in the heated zone of the pump tube 24 in which it is certain that no condensed mercury has deposited, as closely as possible to the gas discharge tube.

When the gas discharge tube 12 cools after switching off the discharge the mercury atoms or molecules are obviously again bound by the wall of the gas discharge tube 12. This is clearly apparent on restarting the (cold) gas discharge tube 12. After the ignition initially only a pure inert gas discharge is obtained. The emission of the desired mercury radiation at 254 nm does not occur intensively again until the wall of the gas discharge tube 12 has again approximately reached its desired operating temperature which also obtained during the forming operation at the instant at which the intensity maximum of the emitted radiation was reached, and the wall liberates the bonded mercury atoms exactly in the amount which results in optimum conditions in the plasma. This is confirmed in that after switching on again the occurrence of the electromagnetic radiation with a wavelength of 254 nm is initially detectable at the points of the wall of the gas discharge tube 12 which are located in the immediate vicinity of the glowing electrodes 16, 20 because these points of the wall of the gas discharge tube 12 reach an adequately high temperature very rapidly.

It is thus seen that by the forming operation according to the invention in the production of a gas discharge light source optimum conditions are created which result in predetermined operating values which in subsequent practical operation of the gas discharge light source must again be substantially observed. It is however possible to carry out an adaptation to appreciably changed ambient temperatures of the gas discharge light source; this can for instance be achieved by suitable increasing or reduction of the electrical operating power.

The method according to the invention is not restricted to mercury or mercury amalgam but can be used with numerous discharge gases. In every case, by the forming operation according to the invention a concentration of the discharge material obviously arises in practice which in operation of the gas discharge light source assumes a value optimum for the desired wavelengths, apparently by diffusion back from the inner walls of the gas discharge tube.

The method according to the invention does not depend on the type of gas discharge tube used. In particular, it is possible to use both gas discharge tubes provided with electrodes as well as so called "electrodeless" gas discharge tubes, an example of which is illustrated in FIG. 4.

The method according to the present invention will be explained in further detail with the aid of the following tests I to III.

Test I

With a measuring arrangement according to FIG. 3 for determining the intensity of the 254 nm line of mercury the intensity of a gas discharge light source made by the method according to the invention and of a commercially usual 40 Watt UVC mercury low-pressure lamp of "ozone-free" quartz glass as comparison normal were recorded. The gas discharge light sources to be compared were shielded by a gap diaphragm arranged perpendicularly to the respective longitudinal axis of the particular gas discharge light source in such a manner that the entire diameter of the gas discharge light source was scanned but only an always constant length of only a few mm thereof. In all the comparison measurements the arrangement of the diaphragms, the measuring range and the sensitivity of the spectral photometer remained the same.

The commercially available low-pressure tube has the following dimensions: total length about 850 mm, distance between the electrodes about 770 mm, outer diameter 19 mm and wall thickness 1 mm.

The comparison gas discharge light source was ignited and after burning for 15 minutes the radiation intensity of the 254 nm spectral line was recorded. The intensity measured value obtained was taken as a base value of 100%, the measured value being checked again before each measurement. The comparison gas discharge light source was operated with a burning voltage of 103 volt and burning current of 0.4 ampere.

The gas discharge light source made by the method according to the invention consisted of exactly the same materials as the comparison gas discharge light source and had the same dimensions but with fused-in tungsten step electrodes designed for a continuous load of about 3 ampere.

The gas discharge source made according to the invention will be referred to hereinafter briefly as "test tube".

The test tube was heated in known manner, evacuated and flushed, and the electrodes thereof were annealed by ion bombardment and formed. The test tube was then filled with pure argon at a pressure of about 200 Pascal. The pump tube was located about 10 cm away from the one end of the test tube and had an outer diameter of 4 mm and an inner diameter of 2 mm. The pump was curved downwardly to a U-shaped loop so that on introducing 20 mg pure mercury under vacuum the resulting small mercury sphere could not drop down into the test tube but remained lying in the U-shaped loop of the pump tube. After the pump tube had been sealed and cooled, the mercury sphere could be rolled along the sealed fused end of the pump tube. At the extension of the pump tube leading to the test tube several narrow strips of aluminium foil were wound on in such a manner that the heating of the test tube also heated an about 30 mm long portion of the pump tube. The test tube was then introduced into the measuring apparatus and ignited.

The electrical operating current of the gas discharge was regulated via a throttle ballast with the aid of a mains regulating transformer to 3 ampere. After a burning duration of 10 minutes the temperature of the test tube had risen to about 170° C. and remained largely constant. In this stage practically only a pure argon discharge was present and the measuring means set to the 254 nm line exhibited such low values that no clear allocation was possible.

The pump tube with the mercury droplet disposed at the end thereof was then introduced into a water bath with a temperature of 50° C. Although at this temperature adequate vapour pressure of the mercury should arise, as apparent from the values indicated at the beginning, even after a period of 10 minutes no appreciable intensity on the 254 nm line could be detected.

The water temperature was now increased to 90° C. After a few minutes it was possible to observe that near the entrance of the pump tube into the test tube a luminous zone formed in the plasma but did not appear to spread. The radiation intensity recorded by the measuring means was about 17% and remained relatively constant. The water bath was then removed from the pump tube and shortly afterwards the radiation intensity diminished appreciably. Even when a temperature of the water bath of 50° C. was intermediately employed, the luminous zone in the plasma near the pump tube disappeared. The small amounts of mercury rising from the pump tube were obviously bonded by the hot walls of the test tube consisting of quartz or diffused into the walls and in this manner were taken from the plasma. As soon as a temperature of the water bath of 90° C. was used again, the original phenomena again occurred.

In the course of the next 50 minutes the radiation intensity on the 254 nm line increased slowly but continuously and finally reached 100% relative intensity. This continuous intensity rise continued obviously because the hot walls of the test tube absorbed progressively less mercury and consequently more mercury was available for the plasma, and after about 120 minutes the radiation intensity had risen to about 325% and remained constant for about 10 minutes.

When the intensity then exhibited a slight drop, the discharge was quickly switched off, the heat insulation (aluminium strips) round the beginning of the pump tube removed, and the latter then fused off and sealed near the joint to the test tube.

Renewed ignition of the not yet completely cooled test tube and starting operation thereof again with 3 ampere current strength soon led to the maximum intensity value of 325% which however then clearly diminished. Thereupon the current strength was reduced to about 2.5 ampere and as a result the temperature of the test tube decreased to about 145° C., the intensity of the radiation on the 254 nm line then stabilizing itself at a value of about 300%. This result was reproduceable because a renewed increase of the current strength to 3 ampere caused the intensity value to rise temporarily rapidly to 325%, which however then diminished again. A return to a discharge current of 2.5 ampere stabilized the radiation intensity again at a value of 300%.

The spectrum was then recorded in a range between 280 and 230 nm. The result was a single peak at 254 nm with an intensity of 300%.

24 hours later a control measurement was performed. In it, immediately after the ignition of the cold test tube at 2.5 ampere discharge current the typical bluish-white glowing of the plasma could be observed only at the glowing electrodes. The major cold portion of the test tube exhibited only the watery blue glow of the argon discharge. The measuring apparatus did not shown any appreciable radiation on the 254 nm line for this portion of the test tube. However, it was possible to obtain such an intensive radiation in locally limited form immediately on heating the cold portion of the test tube at any point with the flame of a gas burner. The resulting brightly glowing plasma spot soon disappeared again after removing the flame. After expiration of about 7 minutes the typical bluish-white glow of the electrodes spread towards the middle of the test tube and finally filled the latter uniformly, the intensity measured value rising rapidly and then stabilizing at 300% radiation intensity.

The electrical operating data were 61 volts for the operating voltage of the test tube and 2.5 ampere for the operating current.

Test II

The test tube had the following dimensions: total length about 850 mm, distance between the electrodes about 770 mm, outer diameter 23 mm and wall thickness 1 mm. As electrodes, the same tungsten step electrodes for 3 ampere permanent load were fused in as in test I. The test tube was heated out in known manner, evacuated, and after annealing and forming of the electrodes filled with pure argon at a pressure of about 250 Pascal; 20 mg pure mercury was then introduced. The straight pump tube was sealed off to leave a length of about 10 cm. The mercury droplet was in the test tube and the latter was introduced into a heatable container as illustrated for instance in FIG. 2, being exposed therein for 2 hours to a temperature of 250° C.

After recording the "comparison normal" with the aid of the commercially available 40 Watt UVC comparison tube, the test tube was introduced into the intensity measuring apparatus, ignited and operated with 4 ampere discharge current. Once again the pump tube was wrapped with aluminium foil close to the body of the test tube as in example I.

Firstly, the known phenomena of the discharge were observed; at the high current intensity of 4 ampere the plasma column glowed bright white, was somewhat constricted and exhibited a slight ripple and motion. The radiation intensity of the test tube on the 254 nm line was about 30% (relatively to the comparison tube).

After 15 minutes burning duration, occasionally also heating the pump tube with a gas flame to avoid initially any condensate formation of the mercury, the pump tube was immersed into a water bath at room temperature. During the next 25 minutes the radiation intensity on the 254 nm line increased only negligibly. The cooling water for the pump tube was then replaced by iced water with numerous pieces of ice floating therein. A slow but continuous rise of the radiation intensity was now observed and after about 80 minutes a maximum value of almost 400% had been reached. The plasma column had assumed the typical blue-white colour, burnt uniformly without motion and filled the entire diameter of the test tube.

The ice water was now removed, the aluminium strips of the pump tube near the body of the test tube were taken away and the pump tube rapidly sealed off at this point. Re-ignition of the test tube resulted in a stable radiation power on the 254 nm line of about 375% when the current strength had been reduced to 3.6 ampere.

After 24 hours a control measurement was made which showed the phenomena known from test I. After ignition of the test tube a radiation-intensity bluish-white plasma zone was observed firstly only in the immediate vicinity of the brightly glowing electrodes and with increasing temperature of the test tube propagated itself slowly in the forward direction, filling the body of the test tube uniformly after about 8 to 10 minutes. The heating of a still relatively cool portion of the test tube with a gas flame generated at the point concerned a radiation-intensive brightly glowing plasma zone which after removal of the flame and cooling of the respective point diminished again. After about 15 minutes thermal equilibrium with the surroundings was reached and a constant radiation intensity on the 254 nm line of 370 to 375% for a current strength of 3.6 ampere was observed.

When, on renewed ignition of the cold test tube the current strength was first set to 4.2 ampere it took only about 6 to 7 minutes until a high radiation intensity of about 400% could be measured in the middle of the test tube as well, this intensity however soon diminishing again.

When a value of 3.6 ampere discharge current was then again set, the test tube stabilized at a radiation intensity of 370 to 375% again. This intensity was achieved with a burning voltage of 55 volts and a burning current of 3.6 ampere.

Admittedly, the value of the radiation intensity was somewhat lower than expected. This was however apparently due to the fact that the electrodes designed for 3 ampere were loaded beyond their capacity when the test tube was operated with a burning current of 3.6 ampere and consequently the electrodes started to emit vaporizing and degassing products which contaminated the composition of the plasma in the test tube.

Test III

The purpose of this comparison test was to determine whether the properties explained above could also be observed with an "electrodeless" test tube. The aim was not a quantitative determination of the individual parameters but only to check the qualitative similarity.

A double-wall test tube was made consisting of two nested concentrically disposed quartz tubes. The outer tube had a diameter of 23 mm. The ends of the two tubes were fused together in gas-tight manner; the passage of the inner tube was free so that the double-walled tube could be pushed over a rod in the manner of a sleeve. To the outer tube, about 10 cm away from the end, a pump tube was attached which was connected to an annular cavity between the two tubes, thereby enabling the latter to be evacuated.

This hollow jacket tube was heated out in known manner, evacuated, filled with pure argon at a pressure of about 200 Pascal and a mercury amount of 20 mg introduced. The pump tube was then sealed to leave a length of about 8 cm.

The test tube had a total length of 750 mm, an outer diameter of 23 mm, an inner diameter of 15 mm and a wall thickness of 1 mm in each case.

This "electrodeless" test tube was pushed onto an aluminium tube having a diameter of 14 mm and a length of 100 cm. This aluminium tube was pushed onto a magnetron tube (microwave tube) with a power of 450 watts and served as antenna.

This arrangement comprising the test tube, antenna and magnetron tube was introduced into the measuring apparatus for determining the intensity of the radiation on the 254 nm line, the magnetron tube cooled with an air fan and the current supply for the magnetron tube then switched on. A few seconds after switching on the current the test tube started to glow spontaneously and very rapidly (within 30 seconds) with the bright light of the mercury discharge. Within one minute the spectral photometer 48, 50 set to the 254 nm line recorded a radiation intensity of about 280% which then diminished again almost as rapidly and stabilized at about 20 to 25%. Even after a further burning duration of 20 minutes the radiation intensity did not increase again.

The current supply for the magnetron tube was then switched off and the pump tube immersed in a vessel with ice water. The tube was again ignited and initially the behaviour of the test tube was as in the first test. A rapid rise of the radiation intensity on the 254 nm line was followed by an almost equally rapid drop to low values. However, after about 10 minutes the intensity of the radiation on the 254 nm line increased slowly and after 40 minutes reached a maximum value of about 290% which remained constant for a relatively long period and then again slowly diminished.

The test was broken off here because the quantitative information was not important; to obtain such information the microwave energy coupled into the test tube would for instance also have had to be determined. The present test provided the desired proof, i.e. that the method according to the invention can be used both with test tubes provided with electrodes and with "electrodeless" test tubes.

The method according to the invention is not restricted to mercury as discharge gas but can be generally employed, for example also for alkali metal vapour gas discharge tubes.

Although the mechanism on which the method according to the invention is based has not yet been completely explained, the essence thereof would appear to be that under operating conditions, that is for a certain discharge with a certain discharge voltage, a certain discharge current and the resulting electron energy and electron density, initially making available in the plasma of the gas discharge enough concentration of the discharge gas for the latter to be incorporated partially in the hot walls of the gas discharge tube, establishing equilibrium with the plasma. The partial pressure of the "free" discharge gas not incorporated in the walls of the gas discharge tube is then rapidly reduced until no more condensed gas discharge material is present in the gas discharge tube, in particular no reservoir of condensed liquid gas discharge material and in particular no so called cold spot. A predetermined partial pressure of the remaining gaseous discharge material in conjunction with the electron density and electron energy obtaining then appears to provide preferred conditions for generation of desired wavelengths.

The above considerations apply of course accordingly to a gas discharge tube according to the present invention having a substance which under operating conditions forms a discharge gas and in which the substance is substantially incorporated in the inner wall of the gas discharge tube. The substance may also be incorporated in a fluorescent layer at the inner wall of the gas discharge tube.

I claim:

1. A gas discharge tube comprising:
   an inner wall of said gas discharge tube; and
   a discharge gas material which under operating conditions forms a discharge gas, wherein the discharge gas material is diffused into an upper layer of the inner wall of the gas discharge tube and no condensed discharge gas material is present in the gas discharge tube.

2. A gas discharge tube according to claim 1, wherein the discharge gas material is an alkali metal or mercury.

3. A gas discharge tube according to claim 1, wherein a fluorescent layer is provided at the inner surface of the gas discharge tube.

4. A gas discharge tube according to claim 3, wherein the discharge gas material is completely or partially deposited in the fluorescent layer at the inner wall of the gas discharge tube.

* * * * *